(12) United States Patent
Matsuzawa

(10) Patent No.: US 11,231,891 B2
(45) Date of Patent: Jan. 25, 2022

(54) PRINT CONTROL DEVICE, PRINT CONTROL METHOD, AND NON-TRANSITORY COMPUTER-READABLE STORAGE MEDIUM STORING PRINT CONTROL PROGRAM

(71) Applicant: SEIKO EPSON CORPORATION, Tokyo (JP)

(72) Inventor: Tomoki Matsuzawa, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/234,918

(22) Filed: Apr. 20, 2021

(65) Prior Publication Data
US 2021/0334054 A1 Oct. 28, 2021

(30) Foreign Application Priority Data
Apr. 23, 2020 (JP) .............................. JP2020-076437

(51) Int. Cl.
*G06F 3/12* (2006.01)

(52) U.S. Cl.
CPC .......... *G06F 3/1257* (2013.01); *G06F 3/1204* (2013.01); *G06F 3/1292* (2013.01)

(58) Field of Classification Search
CPC ..... G06F 3/1257; G06F 3/1204; G06F 3/1292
USPC ....................................................... 358/1.15
See application file for complete search history.

(56) References Cited

U.S. PATENT DOCUMENTS

| 9,658,806 B2 * | 5/2017 | Fallon ................... G06F 3/1228 |
| 2012/0050799 A1 * | 3/2012 | Towata ................. G06F 3/1288 358/1.15 |
| 2019/0294386 A1 * | 9/2019 | Iwamoto ............... G06F 3/1204 |
| 2019/0303068 A1 | 10/2019 | Yamada | |

FOREIGN PATENT DOCUMENTS

JP        2019-175313  A      10/2019

OTHER PUBLICATIONS

"CUPS Plenary" issued by Michael Sweet, Apple Inc. on May 15, 2018 https://ftp.pwg.org/pub/pwg/liaison/openprinting/presentations/cups-plenary-May-18.pdf.

* cited by examiner

*Primary Examiner* — Neil R McLean
(74) *Attorney, Agent, or Firm* — Workman Nydegger

(57) ABSTRACT

Provided is a personal computer which is communicatively coupled to a printer, the personal computer including: an OS that has a display function of displaying a standard print setting screen, and a print function; a server section that causes the printer to be recognized by the print function of the OS, acquires standard print data output by the print function of the OS, converts the acquired data into custom print data, and transmits the custom print data to the printer; and a custom print setting section that, when the standard print data is output from the OS to the server section, displays a custom print setting screen, and that, when a custom print setting is set, transmits the custom print setting to the server section, in which the server section converts the standard print data into the custom print data based on the custom print setting.

15 Claims, 4 Drawing Sheets

PRINT CONTROL DEVICE, PRINT CONTROL METHOD, AND NON-TRANSITORY COMPUTER-READABLE STORAGE MEDIUM STORING PRINT CONTROL PROGRAM

The present application is based on, and claims priority from JP Application Serial Number 2020-076437, filed Apr. 23, 2020, the disclosure of which is hereby incorporated by reference herein in its entirety.

BACKGROUND

1. Technical Field

The present disclosure relates to a print control device, a print control method, and a non-transitory computer-readable storage medium storing a print control program.

2. Related Art

In the related art, there is known a technique for setting a setting value of various setting items for a printing device such as a printer without installing a printer driver.

For example, JP-A-2019-175313 discloses a program that is executable by an information processing apparatus in which an operating system having a print function is installed, the program including a management program and a print server program, where the management program registers a print server configured by the print server program as a virtual printer in the operating system.

In the configuration disclosed in JP-A-2019-175313, the management program and the print server program make it possible for the operating system to recognize a printer that does not support the print function of the operating system and to allow the printer to print. However, in the configuration disclosed in JP-A-2019-175313, since a print setting is limited to items on a print setting screen displayed by the print function of the operating system, when the printer has a specific function that cannot be set on the print setting screen displayed by the print function of the operating system, the printer's specific function cannot be supported.

SUMMARY

According to an aspect of the present disclosure, there is provided a print control device which is communicatively coupled to a printing device supporting print data in a predetermined format, the print control device including: an operating system that has a display function of displaying a first print setting screen including a plurality of setting items, and a print function; a data conversion section that causes the printing device to be recognized by the print function of the operating system, acquires first print data output by the print function of the operating system, converts the first print data into second print data which is the print data in the predetermined format different from the first print data, and transmits the second print data to the printing device; and a custom setting section that, when the first print data is output from the operating system to the data conversion section, displays a second print setting screen including a custom setting item different from the setting items included in the first print setting screen, and that, when a custom setting value of the custom setting item is set, transmits the set custom setting value to the data conversion section, in which the data conversion section converts the first print data into the second print data based on the custom setting value.

According to another aspect of the present disclosure, there is provided a print control method for a print control device which is communicatively coupled to a printing device supporting print data in a predetermined format and in which an operating system having a display function of displaying a first print setting screen and a print function is installed, the print control method including: recognizing the printing device as a printing device supporting first print data different from the print data in the predetermined format; displaying a first print setting screen including a print instruction button and a plurality of setting items; displaying a second print setting screen including a custom setting item different from the setting items included in the first print setting screen when a print instruction is given by the print instruction button; generating second print data which is the print data in the predetermined format based on a set custom setting value of the custom setting item when the custom setting value is set; and transmitting the second print data to the printing device.

According to still another aspect of the present disclosure, there is provided a non-transitory computer-readable storage medium storing a print control program for a print control device which is coupled to a printing device supporting print data in a predetermined format and in which an operating system having a display function of displaying a first print setting screen including a print instruction button and a plurality of setting items and a print function is installed, the print control program causing a processor of the print control device to execute: a function of displaying a second print setting screen including a custom setting item different from the setting items included in the first print setting screen when a print instruction is given to the printing device by the print instruction button; and a function of transmitting, to the printing device, a custom setting value of the custom setting item related to conversion from first print data different the print data in the predetermined format into second print data which is the print data in the predetermined format when the custom setting value is set.

DESCRIPTION OF EXEMPLARY EMBODIMENTS

Hereinafter, embodiments will be described with reference to the drawings.

Figure 1:
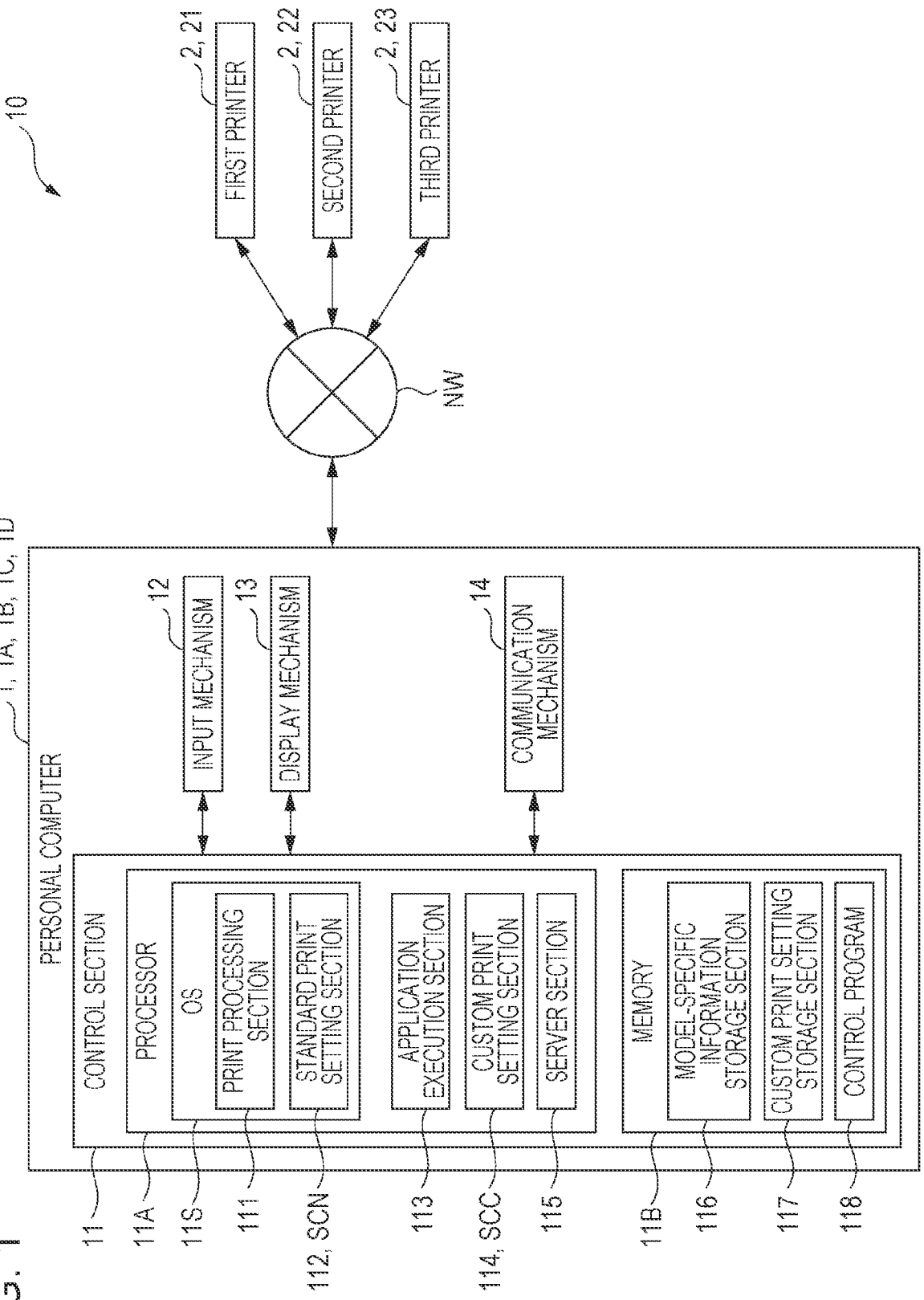
FIG. 1 is a diagram illustrating an example of a printing system including a configuration of a personal computer.

FIG. 1 is a diagram illustrating an example of a printing system 10 including a configuration of a personal computer 1.

The personal computer 1 is communicatively coupled to a printer 2 via a network NW. The network NW is the Internet. The personal computer 1 outputs a print instruction to the printer 2 via the network NW.

The printer 2 prints an image on a recording medium such as printing paper according to the print instruction from the personal computer 1. The printer 2 includes an ink jet print head, and forms an image on a recording medium with ink ejected from the print head.

The printer 2 performs printing on a recording medium by an ink jet method, but the printer 2 may perform printing on a recording medium by adhering toner to a printing surface by an "electrophotographic method".

The network NW is the Internet, but the present disclosure is not limited thereto. The network NW may be a local area network (LAN) or a wide area network (WAN).

The printer 2 corresponds to an example of a "printing device".

The "printing device" is the printer 2, but the present disclosure is not limited thereto. The "printing device" may be a copying machine or a multifunction device having a fax function as long as it has a print function.

The printing system 10 includes a first printer 21, a second printer 22, and a third printer 23. When the first printer 21, the second printer 22, and the third printer 23 are not distinguished, each is referred to as the printer 2. Specific identification information is assigned to each of the first printer 21, the second printer 22, and the third printer 23 in advance. The specific identification information is an Internet Protocol (IP) address or a printer name.

The personal computer 1 determines the printer 2 to output the print instruction based on the specific identification information of the printer 2. The printer 2 is a printing device that does not support a print function of an OS 11S to be described later. The printer 2 is a printing device that supports print data in a predetermined format output from a printer driver to perform printing. The print data in the predetermined format is print data in an ESC/P format.

The printing system 10 includes three printers, but the present disclosure is not limited thereto.

The personal computer 1 includes a control section 11, an input mechanism 12, a display mechanism 13, and a communication mechanism 14. The personal computer 1 includes the input mechanism 12 and the display mechanism 13, but each of the input mechanism 12 and the display mechanism 13 may be separate from the personal computer 1.

The personal computer 1 corresponds to an example of a "print control device".

The control section 11 controls the operation of the personal computer 1.

The input mechanism 12 receives an input from a user, generates an input signal corresponding to the received input, and transmits the input signal to the control section 11. The input mechanism 12 is a keyboard. The input mechanism 12 separate from the personal computer 1 is a mouse.

The display mechanism 13 includes a liquid crystal display (LCD), which is a display screen, and displays various images on the LCD according to instructions from the control section 11.

The communication mechanism 14 communicates with the printer 2 via the network NW according to the instruction from the control section 11. The communication mechanism 14 communicates with the printer 2 in accordance with the Ethernet (registered trademark) standard.

The communication mechanism 14 communicates with the printer 2 in accordance with the Ethernet standard, but the present disclosure is not limited thereto. The communication mechanism 14 may communicate with the printer 2 by wireless communication such as Wi-Fi (registered trademark).

The control section 11 is a controller including a processor 11A and a memory 11B.

The memory 11B is a storage device that non-volatilely stores programs and data executed by the processor 11A. The memory 11B is composed of a magnetic storage device such as a hard disk drive (HDD), a semiconductor storage device such as a solid state drive (SSD), a semiconductor storage element such as a flash read only memory (ROM), or other types of non-volatile storage devices. The memory 11B may include a random access memory (RAM) that constitutes a work area of the processor 11A. The memory 11B stores data processed by the control section 11 and a control program 118 executed by the processor 11A.

The processor 11A executes the control program 118 on an operating system (OS) 11S. The OS 11S is a Mac (registered trademark) OS or a Linux (registered trademark) OS.

Hereinafter, a case where the OS 11S is Mac OS will be described. In other words, the personal computer 1 is manufactured by Apple Inc. The personal computer 1 is a so-called Macintosh (registered trademark).

The processor 11A may be configured by a single processor, or a plurality of processors may function as the processor 11A. The processor 11A executes the control program 118 to control the personal computer 1.

Although the processor 11A executes the control program 118 to control the personal computer 1, the control section 11 may execute processing by a function implemented in an application specific integrated circuit (ASIC), or a signal processing circuit may perform signal processing to execute the processing.

The control program 118 corresponds to an example of a "print control program".

The OS 11S includes a print processing section 111 and a standard print setting section 112.

The print processing section 111 executes the print function of the OS 11S. The print function of the OS 11S corresponds to AirPrint (registered trademark). When the standard print setting section 112 performs a standard print setting SPN, which is a setting of a plurality of setting items included in a standard print setting screen SCN, based on the print function of the OS 11S, the print processing section 111 outputs standard print data DPN. The standard print setting SPN is a setting set by the print function of the OS 11S.

The standard print data DPN corresponds to an example of "first print data". The standard print data DPN is print data in a format different from the print data in the predetermined format supported by the printer 2. The format of the standard print data DPN is a portable document format (PDF), a bitmap file format, and the like.

The standard print setting section 112 displays the standard print setting screen SCN on the LCD of the display mechanism 13. The standard print setting screen SCN is a screen that receives the standard print setting SPN, which is the setting of the plurality of setting items in the print function of the OS 11S, from the user. Examples of the plurality of setting items include an output printing device, the number of prints, a size of printing paper, enlargement/reduction setting, color/monochrome setting, and the like.

The standard print setting SPN corresponds to an example of a "setting of a plurality of setting items included in a first print setting screen".

The standard print setting screen SCN corresponds to an example of a "first print setting screen".

The control section 11 includes an application execution section 113, a custom print setting section 114, a server section 115, a model-specific information storage section 116, and a custom print setting storage section 117. When the processor 11A executes the control program 118, the processor 11A functions as the application execution section 113, the custom print setting section 114, and the server section 115, and the memory 11B functions as the model-specific information storage section 116 and the custom print setting storage section 117.

The model-specific information storage section 116 stores a printer name, an IP address associated with the printer name, and the like as the specific identification information of the printer 2 in association with model-specific information. The model-specific information includes information indicating a setting item of a custom print setting SPC. The custom print setting SPC indicates the print setting specific to the model of the printer 2.

The custom print setting storage section 117 stores the custom print setting SPC, which is a setting value of a custom setting item, in association with a printer name and a job name.

The custom print setting SPC corresponds to an example of a "custom setting value of a custom setting item".

The custom setting item includes a setting item for setting enabling and disabling of borderless printing.

The job name is a name given by an application program to a print job output from the application program executed by the application execution section 113 on the OS 11S.

The application execution section 113 executes an application program on the OS 11S. The application program includes WORD (registered trademark), EXCEL (registered trademark), and the like manufactured by Microsoft Corporation.

The custom print setting section 114 displays a custom print setting screen SCC including a custom setting item different from the setting items included in the standard print setting screen SCN on the LCD of the display mechanism 13. The custom print setting section 114 receives the custom print setting SPC, which is the custom setting value of the custom setting item included in the custom print setting screen SCC, from the user. In addition, the custom print setting section 114 outputs the received custom print setting SPC to the server section 115.

The custom print setting screen SCC corresponds to an example of a "second print setting screen".

The custom print setting section 114 corresponds to an example of a "custom setting section".

The server section 115 functions as an Internet Printing Protocol (IPP) server. The server section 115 acquires the standard print data DPN output from the print processing section 111 and converts the standard print data into custom print data DPC which is print data in a predetermined format. The server section 115 transmits the custom print setting SPC and the custom print data DPC to the printer 2.

The server section 115 has a function of causing the print processing section 111 to recognize the printer 2 that does not support the print function of the OS 11S as a virtual printer that supports the print function of the OS 11S. The server section 115 acquires model-specific information of the printer 2, replaces it with virtual printer-specific information JP, which is specific information of the virtual printer to be described later, and transmits the information to the print processing section 111. The print processing section 111 can recognize the virtual printer based on the virtual printer-specific information JP and output the standard print data DPN to the server section 115.

The custom print data DPC corresponds to an example of "second print data".

The server section 115 corresponds to an example of a "data conversion section".

The virtual printer corresponds to an example of a "virtual printing device".

Figure 2:
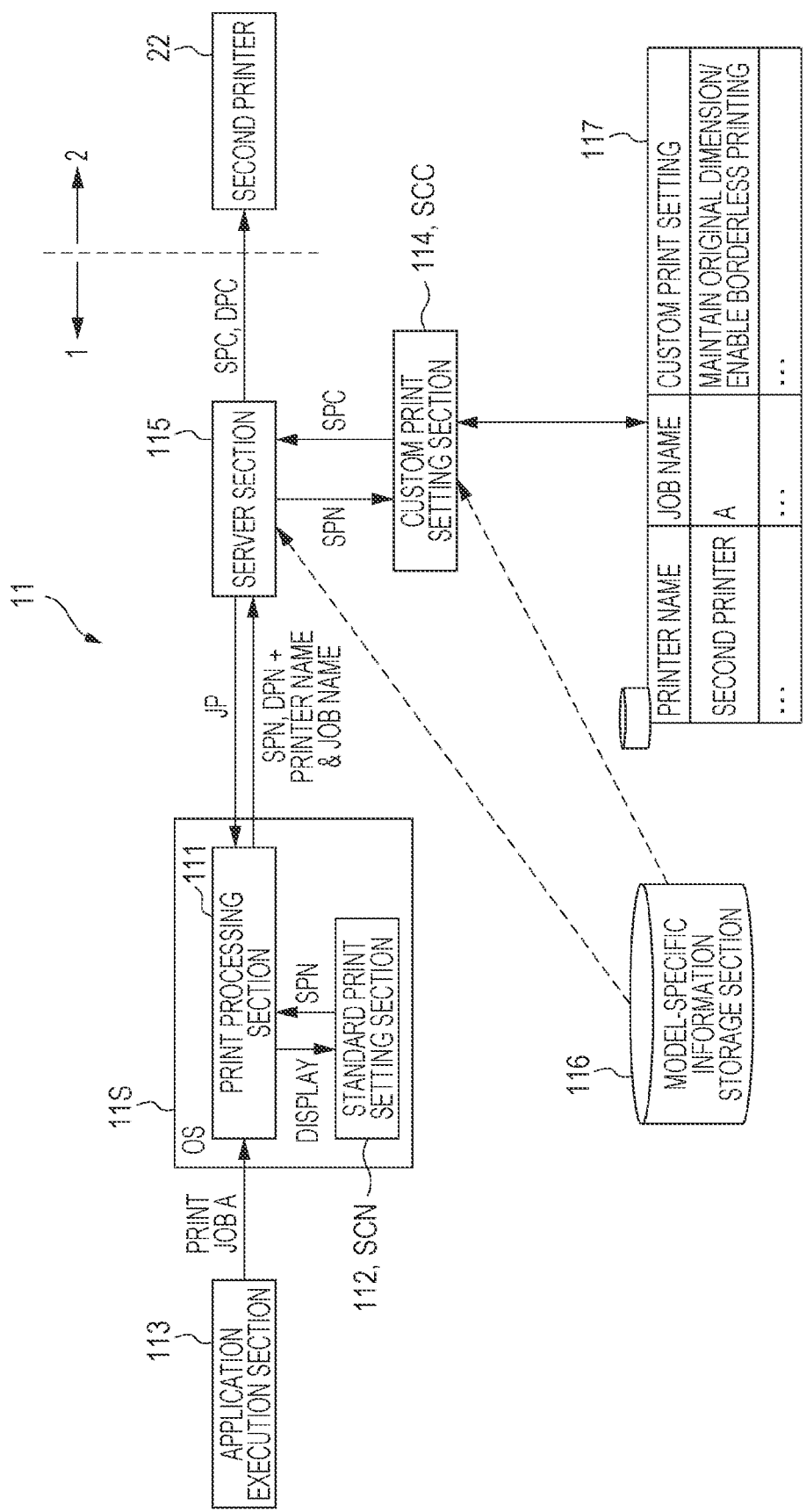
FIG. 2 is a diagram illustrating an example of a configuration of a personal computer.

FIG. 2 is a diagram illustrating an example of a configuration of the personal computer 1.

As illustrated in FIG. 2, the OS 11S outputs the standard print data DPN to the server section 115. When the server section 115 acquires the standard print data DPN, the server section 115 causes the custom print setting section 114 to display the custom print setting screen SCC.

The custom print setting section 114 stores the custom print setting SPC, which is the custom setting value of the custom setting item included in the custom print setting screen SCC, in the custom print setting storage section 117 in association with the printer name and the job name. The server section 115 acquires the custom print setting SPC from the custom print setting storage section 117.

Figure 3:
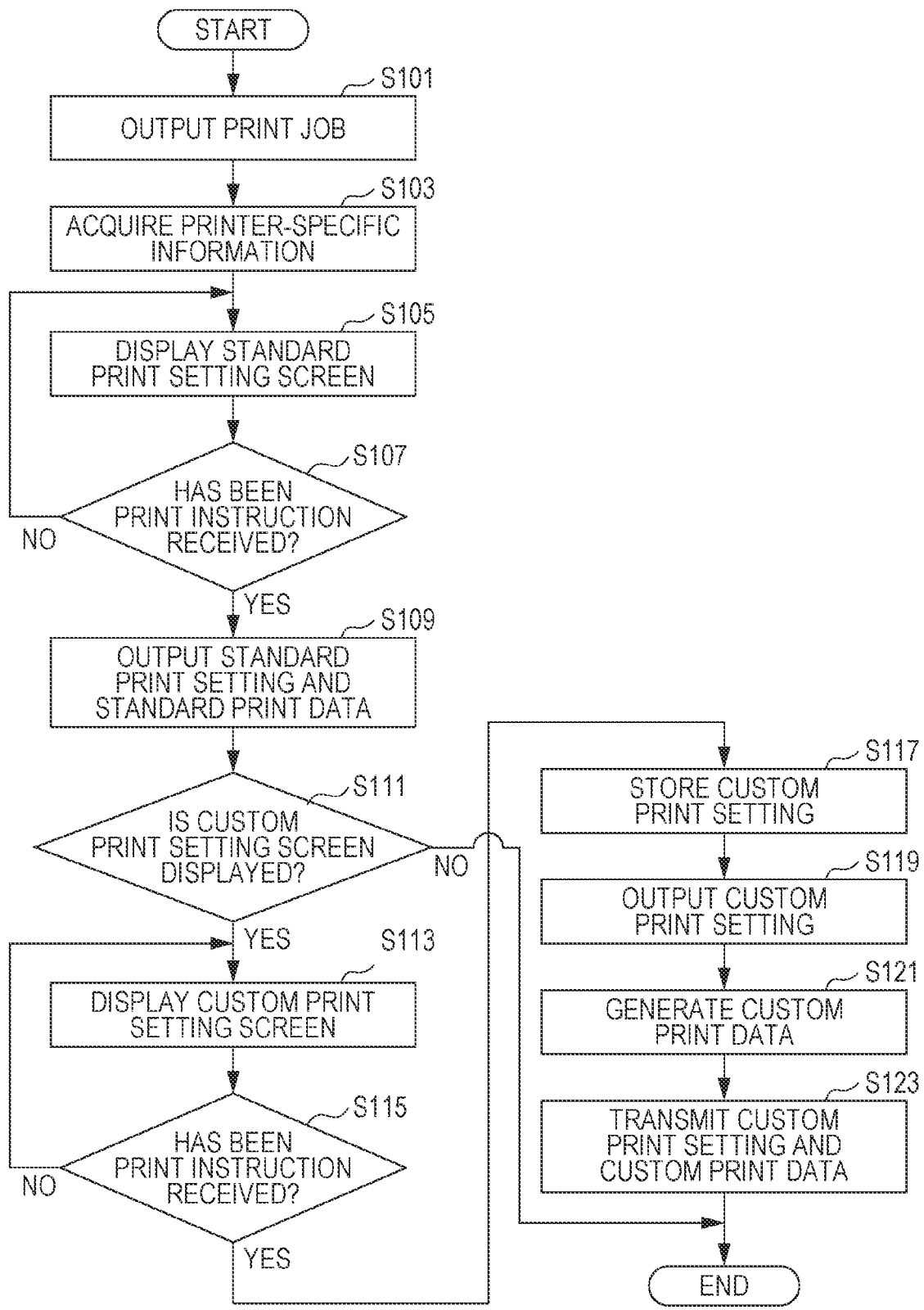
FIG. 3 is a flowchart illustrating an example of processing of a control section.

FIG. 3 is a flowchart illustrating an example of processing of the control section 11. Hereinafter, the flowchart illustrated in FIG. 3 will be described with reference to FIG. 2.

In step S101, the application execution section 113 outputs a print job to the print processing section 111. The job name of the print job is job A.

In step S103, the standard print setting screen SCN is displayed. On the standard print setting screen SCN, the settings of the printer 2 for printing the print job is received from a user. The print processing section 111 acquires the virtual printer-specific information JP corresponding to the first printer 21 from the server section 115 in advance. The virtual printer-specific information JP corresponds to the setting item included in the standard print setting screen SCN. A virtual printer corresponding to the second printer 22 is selected as a target printer 2 for outputting the print job.

In step S105, the standard print setting section 112 displays the standard print setting screen SCN on the LCD of the display mechanism 13 based on the virtual printer-specific information JP, and receives the standard print setting SPN, which is the setting value of the setting item included in the standard print setting screen SCN.

In step S107, the standard print setting section 112 determines whether or not a print instruction has been received based on the input of the user to the standard print setting screen SCN. The standard print setting screen SCN has a print instruction button, and when the print instruction button is clicked, the standard print setting section 112 receives a print instruction.

When the standard print setting section 112 determines that the print instruction has not been received (step S107: NO), the process returns to step S105. When the standard print setting section 112 determines that the print instruction has been received (step S107: YES), the process proceeds to step S109.

In step S109, the print processing section 111 outputs the standard print setting SPN, that is, a setting value of a plurality of setting items included in the standard print setting screen SCN and the standard print data DPN to the server section 115 in association with the printer name and the job name.

In step S111, the server section 115 that has acquired the standard print data DPN notifies the custom print setting section 114 that the standard print data DPN has been acquired. The custom print setting section 114 determines whether or not to display the custom print setting screen SCC. The custom print setting section 114 displays the confirmation screen 300 illustrated in FIG. 4 on the LCD of the display mechanism 13 and receives whether or not to display the custom print setting screen SCC.

When the custom print setting section 114 determines that the custom print setting screen SCC is not displayed (step S111: NO), the server section 115 transmits the standard print setting SPN and the standard print data DPN to the second printer 22, and then the process ends. When the custom print setting section 114 determines that the custom print setting screen SCC is displayed (step S111: YES), the process proceeds to step S113.

In step S113, the custom print setting section 114 specifies a target printer 2 to be instructed to print based on the print settings included in the print job received by the print processing section 111. The custom print setting section 114 acquires model-specific information corresponding to the specified printer 2 from the model-specific information storage section 116. The printer 2 is the second printer 22. The custom print setting section 114 constructs the custom print setting screen SCC based on the model-specific information, displays the custom print setting screen SCC on the LCD of the display mechanism 13 and receives the custom print setting SPC which is the custom setting value of the custom setting item.

In step S115, the custom print setting section 114 determines whether or not a print instruction has been received from the user. The print instruction corresponds to the click of a print instruction button displayed on the custom print setting screen SCC.

When the custom print setting section 114 determines that the print instruction has not been received from the user (step S115: NO), the process returns to step S113. When the custom print setting section 114 determines that the print instruction has been received from the user (step S115: YES), the process proceeds to step S117.

In step S117, the custom print setting section 114 stores the custom print setting SPC in the custom print setting storage section 117 in association with the printer name and the job name.

In step S119, the custom print setting section 114 outputs the custom print setting SPC to the server section 115.

In step S121, the server section 115 generates the custom print data DPC by converting the standard print data DPN input in step S109 into the custom print data DPC based on the custom print setting SPC acquired in step S119.

In step S123, the server section 115 transmits the custom print setting SPC and the custom print data DPC to the second printer 22. After that, the process ends.

Figure 4:
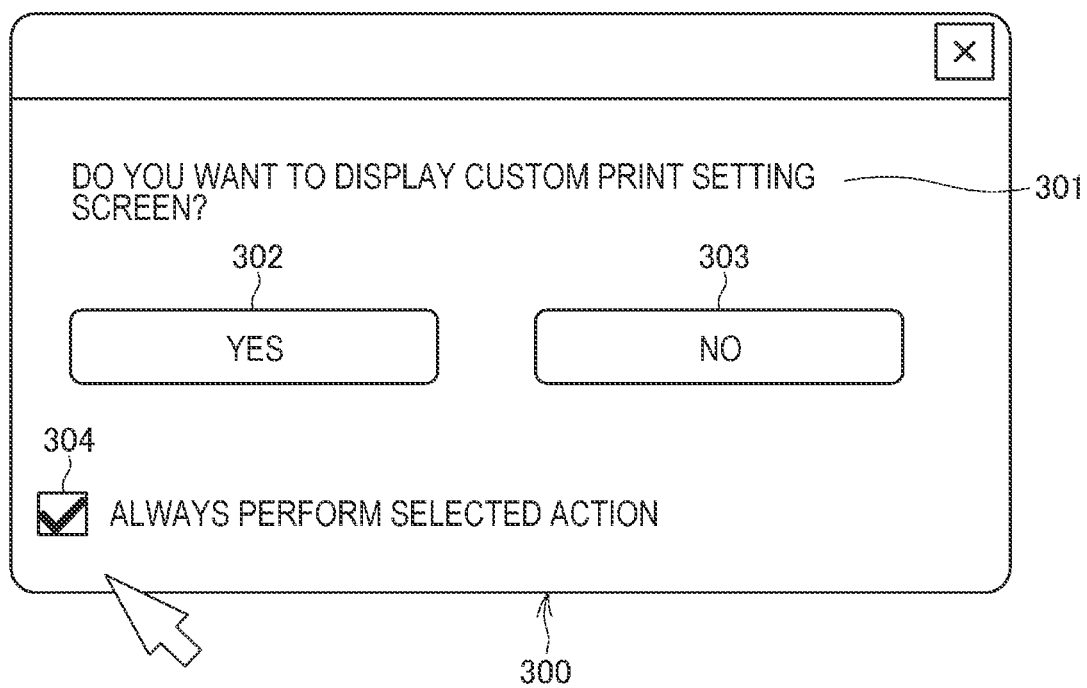
FIG. 4 is a screen view illustrating an example of a confirmation screen for confirming acceptance of a display of a custom print setting screen.

FIG. 4 is a screen view illustrating an example of a confirmation screen 300 for confirming acceptance of the display of the custom print setting screen SCC. The confirmation screen 300 is displayed on the LCD of the display mechanism 13 by the custom print setting section 114 in step S111 of FIG. 3.

The confirmation screen 300 is included in the custom print setting screen SCC.

As illustrated in FIG. 4, the confirmation screen 300 displays a guidance display section 301, a Yes button 302, a No button 303, and a check box 304.

The message "Do you want to display the custom print setting screen?" is displayed on the guidance display section 301.

The Yes button 302 is clicked by the user when the custom print setting screen SCC is displayed. When the Yes button 302 is clicked, the custom print setting section 114 displays the custom print setting screen SCC on the LCD of the display mechanism 13.

The No button 303 is clicked by the user when the custom print setting screen SCC is not displayed.

The check box 304 is checked by the user when "always perform the selected action".

When the Yes button 302 is clicked while the check box 304 is checked, the custom print setting screen SCC is displayed for the job output from the application execution section 113. In this case, when the process of step S109 of FIG. 3 is completed without displaying the confirmation screen 300, the process of step S111 is skipped, the process of step S113 is executed, and the custom print setting screen SCC is displayed.

When the No button 303 is clicked while the check box 304 is checked, the custom print setting screen SCC is not displayed for the job output from the application execution section 113.

It is preferable that whether or not to display the confirmation screen 300 can be changed by a tool that changes the setting of the OS 11S based on the input from the user.

As described above, in the present embodiment, the personal computer 1 which is communicatively coupled to the printer 2 supporting print data in a predetermined format includes the OS 11S that has a display function of displaying a standard print setting screen SCN including a plurality of setting items, and a print function. The personal computer 1 includes the server section 115 that causes the printer 2 to be recognized by the print function of the OS 11S, acquires the standard print data DPN output by the print function of the OS 11S, converts the standard print data into the custom print data DPC which is the print data in the predetermined format different from the standard print data DPN, and transmits the custom print data DPC to the printer 2. The personal computer 1 includes the custom print setting section 114 that, when the standard print data DPN is output from OS11S to the server section 115, displays a custom print setting screen SCC including a custom setting item different from the setting items included in the standard print setting screen SCN, and that, when a custom print setting SPC, that is, a custom setting value of the custom setting item is set, transmits the custom print setting SPC to the server section 115. The server section 115 converts the standard print data DPN into the custom print data DPC based on the custom print setting SPC which is the custom setting value.

Since the server section 115 generates the custom print data DPC based on the custom print setting SPC, the custom print data DPC that reflects the custom print setting SPC can be generated. When the printer 2 has a specific function that cannot be set on the standard print setting screen SCN, the personal computer 1 can support the specific function of the printer 2.

The standard print setting screen SCN has a print instruction button, and when the print instruction button is clicked, the OS 11S outputs the standard print data DPN to the server section 115.

When the print instruction button is clicked, the OS 11S outputs the standard print data DPN to the server section 115, so that the server section 115 can convert the standard print data DPN into the custom print data DPC.

When the server section 115 acquires the standard print data DPN, the server section 115 causes the custom print setting section 114 to display the custom print setting screen SCC.

When the server section 115 acquires the standard print data DPN, the custom print setting section 114 displays the custom print setting screen SCC, so that the server section 115 can acquire the custom print setting SPC. The server section 115 can convert the standard print data DPN into the custom print data DPC based on the custom print setting SPC.

The custom print setting section 114 displays the confirmation screen 300 for accepting whether or not to display the custom print setting screen SCC before displaying the custom print setting screen SCC, and displays the custom print setting screen SCC when the confirmation screen 300 receives an instruction to display the custom print setting screen.

Before displaying the custom print setting screen SCC, the confirmation screen 300 for accepting whether or not to display the custom print setting screen SCC is displayed, so that the user can easily select whether or not to display the custom print setting screen SCC. User convenience can be improved.

The custom setting item includes a setting item for setting enabling and disabling of borderless printing.

Since the custom setting item includes the setting item for setting enabling and disabling of borderless printing, the user can set enabling and disabling of borderless printing. User convenience can be improved.

In a print control method for the personal computer 1 which is communicatively coupled to the printer 2 supporting print data in a predetermined format and in which the OS 11S having a function of displaying a standard print setting screen SCN and a print function is installed, the printer 2 is recognized as the printer 2 supporting standard print data DPN different from the print data in the predetermined format, and the standard print setting screen SCN including a print instruction button and a plurality of setting items is displayed. When a print instruction is given by the print instruction button, a custom print setting screen SCC including a custom setting item different from the setting items included in the standard print setting screen SCN is displayed. When the custom print setting SPC, which is the custom setting value of the custom setting item, is set, the custom print data DPC which is the print data in the predetermined format is generated, and the custom print data DPC is transmitted to the printer 2, based on the custom print setting SPC.

Since the custom print data DPC is generated based on the custom print setting SPC, the custom print data DPC that reflects the custom print setting SPC can be generated. When the printer 2 has a specific function that cannot be set on the standard print setting screen SCN, the personal computer 1 can support the specific function of the printer 2.

Before displaying the custom print setting screen SCC, the confirmation screen 300 for accepting whether or not to display the custom print setting screen SCC is displayed, and when the confirmation screen 300 receives an instruction to display the custom print setting screen, the custom print setting screen SCC is displayed.

Before displaying the custom print setting screen SCC, the confirmation screen 300 for accepting whether or not to display the custom print setting screen SCC is displayed, so that the user can easily select whether or not to display the custom print setting screen SCC. User convenience is improved.

The personal computer 1 is coupled to the printer 2 supporting the print data in a predetermined format and the OS 11S having a function of displaying the standard print setting screen SCN including a print instruction button and a plurality of setting items and a print function is installed in the personal computer. The processor 11A of the personal computer 1 executes a function of displaying a custom print setting screen SCC including a custom setting item different from the setting items included in the standard print setting screen SCN when a print instruction is given to the printer 2 by the print instruction button, and a function of transmitting, to the printer 2, a custom print setting SPC, that is, a custom setting value of the custom setting item related to conversion from standard print data DPN different the print data in the predetermined format into custom print data DPC which is the print data in the predetermined format when the custom print setting SPC which is the custom setting value of the custom setting item is set.

Since the custom print setting SPC is transmitted to the printer 2, the custom print data DPC that reflects the custom print setting SPC can be generated. When the printer 2 has a specific function that cannot be set on the standard print setting screen SCN, the personal computer 1 can support the specific function of the printer 2.

The present application is not limited to the present embodiment described above, and can be implemented in various modes without departing from the gist thereof.

The input mechanism 12 is a keyboard, but the present disclosure is not limited thereto. The input mechanism 12 may receive an input from a user, generate an input signal corresponding to the received input, and transmit the input signal to the control section 11. The input mechanism 12 may be a touch panel or a mouse.

At least some of the functional blocks illustrated in FIG. 1 may be realized by hardware, or may be configured to be realized by hardware and software, and the present disclosure is not limited to a configuration in which independent hardware resources are arranged as illustrated in the drawing.

The control program 118 executed by the processor 11A of the control section 11 of the personal computer 1 is stored in the memory 11B, but the control program 118 may be stored in the HDD or the like.

In addition, the processing unit of the flowchart illustrated in FIG. 3 is divided according to the main processing contents in order to facilitate understanding of the processing of the control section 11 of the personal computer 1. The embodiment is not limited by the method of dividing the processing units and the names illustrated in the flowchart illustrated in FIG. 3. In addition, the processing of the control section 11 can be divided into more processing units according to the processing content, or can be divided so that one processing unit includes more processing. Further, the processing order of the above flowchart is not limited to the illustrated example.

The print control method for the personal computer 1 can be realized by causing the processor 11A of the control section 11 of the personal computer 1 to execute the control program 118 according to the print control method for the personal computer 1. The control program 118 can also be recorded on a recording medium that is readable by a computer. As the recording medium, a magnetic or optical recording medium or a semiconductor memory device can be used. Examples of the recording medium include a portable or fixed recording medium such as a flexible disk, a compact disk read only memory (CD-ROM), a digital versatile disc (DVD), Blu-ray (registered trademark) disc, a magneto-optical disk, a flash memory, and a card type recording medium. The recording medium may be a non-volatile storage device such as RAM, ROM, or HDD, which is an internal storage device included in the personal computer 1. It is also possible to realize the print control method for the personal computer 1 by storing the control program 118 according to the print control method for the personal computer 1 in a server device or the like and downloading the control program 118 from the server device to the personal computer 1.

What is claimed is:

1. A print control device which is communicatively coupled to a printing device supporting print data in a predetermined format, the print control device comprising:
   an operating system that has a display function of displaying a first print setting screen including a plurality of setting items, and a print function;
   a data conversion section that causes the printing device to be recognized by the print function of the operating system, acquires first print data output by the print function of the operating system, converts the first print data into second print data which is the print data in the predetermined format different from the first print data, and transmits the second print data to the printing device; and
   a custom setting section that, when the first print data is output from the operating system to the data conversion section, displays a second print setting screen including a custom setting item different from the setting items included in the first print setting screen, and that, when a custom setting value of the custom setting item is set, transmits the set custom setting value to the data conversion section,
   wherein the data conversion section converts the first print data into the second print data based on the custom setting value.

2. The print control device according to claim 1, wherein the first print setting screen includes a print instruction button, and when the print instruction button is clicked, the operating system outputs the first print data to the data conversion section.

3. The print control device according to claim 1, wherein the data conversion section causes the custom setting section to display the second print setting screen when the first print data is acquired.

4. The print control device according to claim 3, wherein the custom setting section displays a confirmation screen for accepting whether or not to display the second print setting screen before displaying the second print setting screen, and displays the second print setting screen when the confirmation screen receives an instruction to display the second print setting screen.

5. The print control device according to claim 1, wherein the custom setting item includes a setting item for setting enabling and disabling of borderless printing.

6. A print control method for a print control device which is communicatively coupled to a printing device supporting print data in a predetermined format and in which an operating system having a display function of displaying a first print setting screen and a print function is installed, the print control method comprising:
   recognizing the printing device as a printing device supporting first print data different from the print data in the predetermined format;
   displaying a first print setting screen including a print instruction button and a plurality of setting items;
   displaying a second print setting screen including a custom setting item different from the setting items included in the first print setting screen when a print instruction is given by the print instruction button;
   generating second print data which is the print data in the predetermined format based on a set custom setting value of the custom setting item when the custom setting value is set; and
   transmitting the second print data to the printing device.

7. The print control method according to claim 6, further comprising: converting the first print data output from the operating system into the second print data when the print instruction button is clicked.

8. The print control method according to claim 7, further comprising: displaying the second print setting screen when the first print data is acquired.

9. The print control method according to claim 6, further comprising: displaying a confirmation screen for accepting whether or not to display the second print setting screen before displaying the second print setting screen, and displaying the second print setting screen when the confirmation screen receives an instruction to display the second print setting screen.

10. The print control method according to claim 8, wherein the custom setting item includes a setting item for setting enabling and disabling of borderless printing.

11. A non-transitory computer-readable storage medium storing a print control program for a print control device which is coupled to a printing device supporting print data in a predetermined format and in which an operating system having a display function of displaying a first print setting screen including a print instruction button and a plurality of setting items and a print function is installed, the print control program causing a processor of the print control device to execute:
   a function of displaying a second print setting screen including a custom setting item different from the setting items included in the first print setting screen when a print instruction is given to the printing device by the print instruction button; and
   a function of transmitting, to the printing device, a custom setting value of the custom setting item related to conversion from first print data different the print data in the predetermined format into second print data which is the print data in the predetermined format when the custom setting value is set.

12. The non-transitory computer-readable storage medium according to claim 11, wherein
   when the print instruction button is clicked, the operating system outputs the first print data, and
   the processor is further caused to convert the first print data output from the operating system into the second print data.

13. The non-transitory computer-readable storage medium according to claim 12, wherein the processor is further caused to display the second print setting screen when the first print data is acquired.

14. The non-transitory computer-readable storage medium according to claim 13, wherein the processor is further caused to:
   display a confirmation screen for accepting whether or not to display the second print setting screen before displaying the second print setting screen; and
   display the second print setting screen when the confirmation screen receives an instruction to display the second print setting screen.

15. The non-transitory computer-readable storage medium according to claim 11, wherein the custom setting item includes a setting item for setting enabling and disabling of borderless printing.

* * * * *